United States Patent [19]
Hall

[11] 3,829,544
[45] Aug. 13, 1974

[54] METHOD OF MAKING A UNITARY POLYCRYSTALLINE DIAMOND COMPOSITE AND DIAMOND COMPOSITE PRODUCED THEREBY

[75] Inventor: Howard T. Hall, Provo, Utah

[73] Assignee: Megadiamond Corporation, Provo, Utah

[22] Filed: Apr. 2, 1973

[21] Appl. No.: 346,781

Related U.S. Application Data

[63] Continuation of Ser. No. 96,312, Dec. 9, 1970, abandoned, which is a continuation-in-part of Ser. No. 784,788, Dec. 19, 1968, abandoned.

[52] U.S. Cl. .................................. 264/125, 51/307
[51] Int. Cl. ............................................. B29f 5/00
[58] Field of Search ....... 264/125; 423/446; 51/307;
1/309

[56] References Cited
UNITED STATES PATENTS

| 3,101,260 | 8/1963 | Cheney | 23/209.1 D |
| 3,399,254 | 8/1968 | Dunnington | 23/209.1 D |

Primary Examiner—Robert F. White
Assistant Examiner—J. R. Hall
Attorney, Agent, or Firm—H. Ross Workman

[57] ABSTRACT

A method of making unitary polycrystalline diamond composite by sintering a body of diamond particles at a temperature between about 1100°–3900°K and at a pressure ranging up to about 170 kilobars depending on the temperature.

2 Claims, 6 Drawing Figures

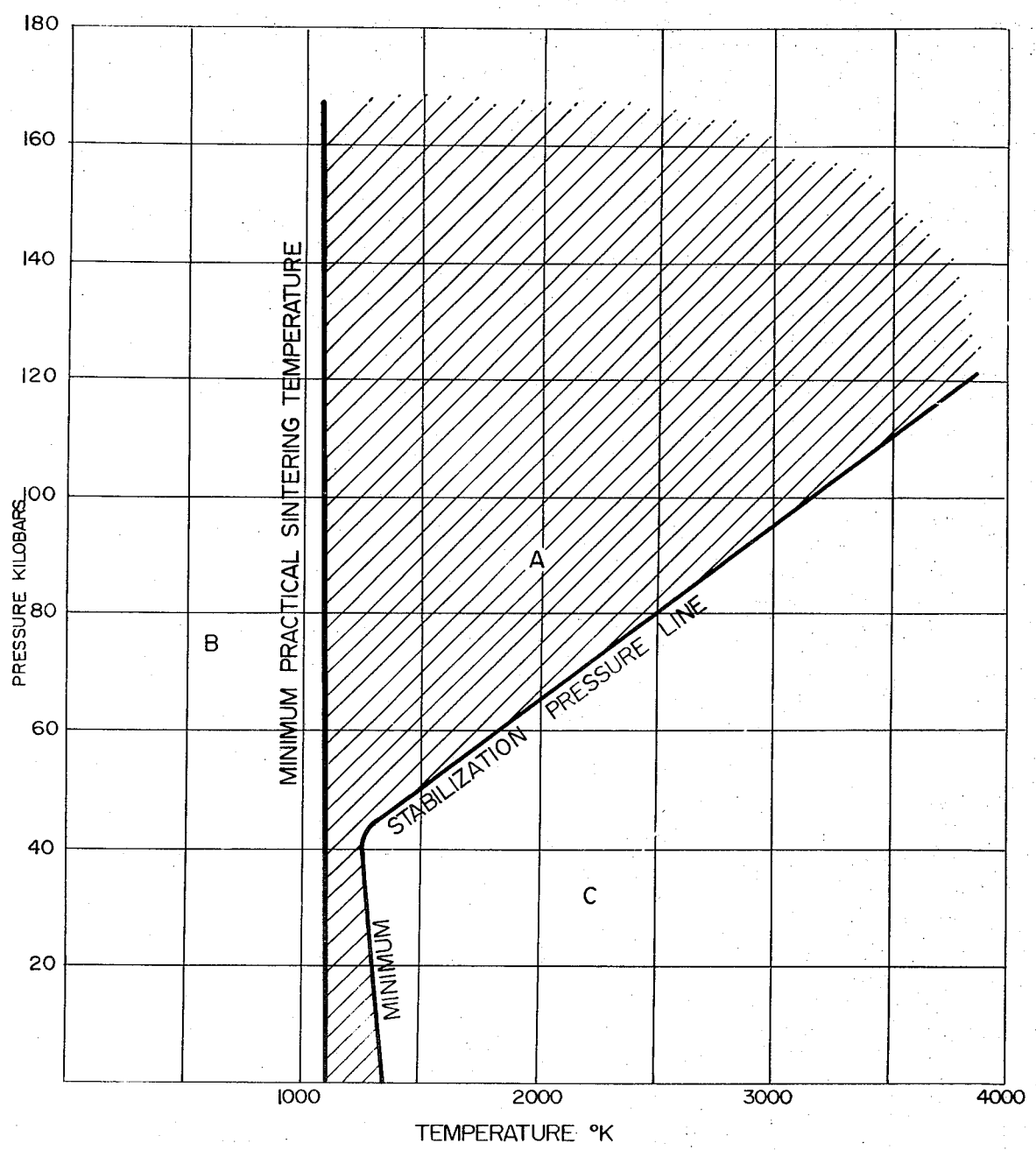

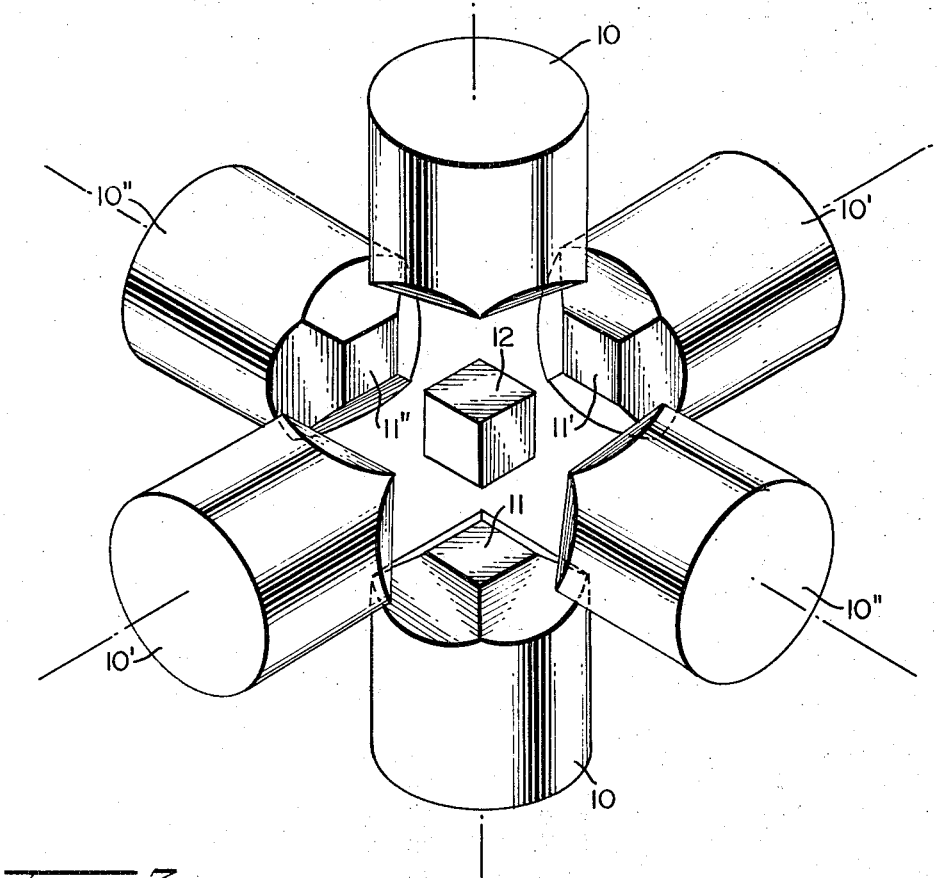
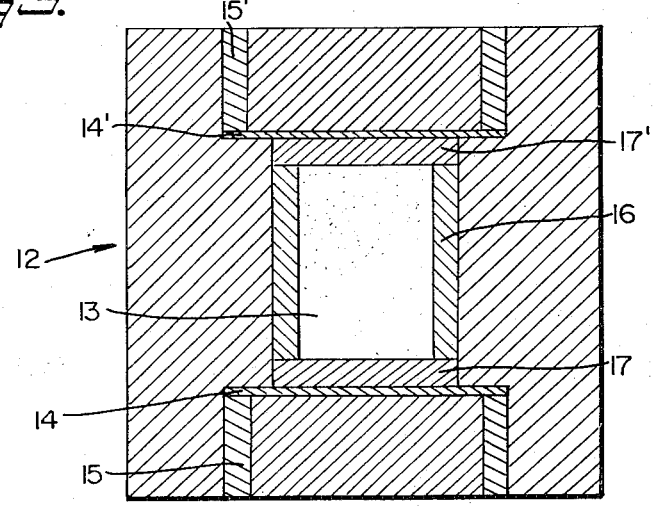

INVENTOR
HOWARD T. HALL

BY Stowell & Stowell

ATTORNEYS

METHOD OF MAKING A UNITARY POLYCRYSTALLINE DIAMOND COMPOSITE AND DIAMOND COMPOSITE PRODUCED THEREBY

This application is a continuation of application Ser. No. 96,312, filed Dec. 9, 1970, now abandoned, and which was a continuation in part of application Ser. No. 784,788, filed Dec. 19, 1968, now abandoned.

This invention relates to a method for sintering diamond particles to produce a unitary polycrystalline diamond composite.

Diamond powder results from the crushing of natural boart, the cutting of diamond to desired shapes and as a byproduct in the use of industrial diamond cutting and grinding tools. Diamond powder is also produced under conditions of high pressure and temperature by synthesis from other forms of carbon. Diamond powder is the most plentiful and relatively least expensive form of diamond available, and the desirability of reclaiming or upgrading diamond powder to a diamond-like composite is apparent.

It is a principal object of the present invention to provide a method for making a unitary shaped polycrystalline diamond composite from diamond particles. Other objects and advantages of the present invention will become apparent upon consideration of the method more fully described herein and in the accompanying drawings wherein:

FIG. 1 is a graphical representation of the critical pressure-temperature range utilized in the method of the present invention;

FIG. 2 is a schematic view of a suitable apparatus and cell for sintering diamond particles in the critical pressure-temperature range shown in FIG. 1;

FIG. 3 is a longitudinal cross sectional view of the cell shown in FIG. 2;

Figure 4:
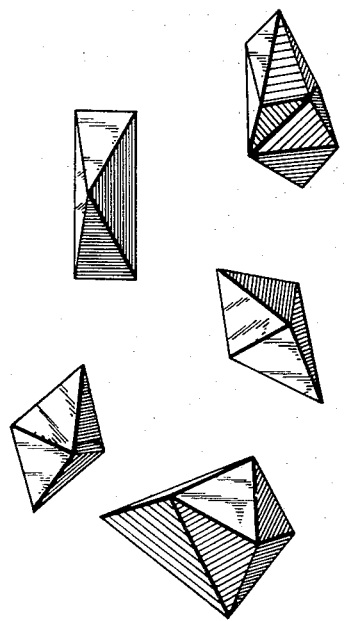
FIG. 4 is a perspective view of several single crystal diamonds grown from smaller crystals.

Ever since the discovery that diamond is simply carbon, attempts have been made to synthesize diamonds from other forms of carbon. Most of these attempts have been directed to the making or growing of single crystal material equivalent to natural diamond. Individual single crystal diamonds grown from smaller crystals are shown in FIG. 4.

Figure 5:
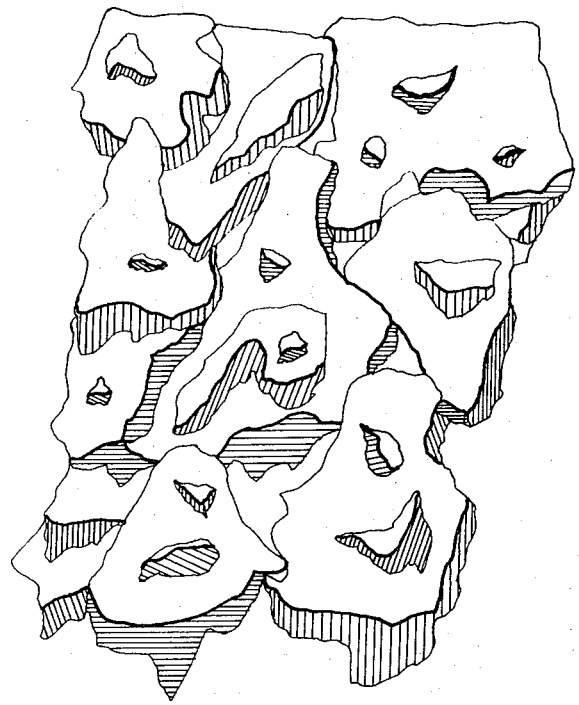
FIG. 5 is a perspective view of a compact mass of sintered polycrystalline diamonds of various sizes prepared by shock wave sintering as known in the prior art.

U.S. Pat. No. 3,399,254 to Dunnington describes the making of a polycrystalline diamond composite from diamond particles. According to the method of the patent, compacted diamond powder is subjected to shock pressures of at least about 300 kilobars produced by shock waves only microseconds in duration. The resultant composite is described as a compact mass of individual sintered particles capable of separation by sieving methods and ranging in size from 50 microns to 1 millimeter in length in admixture with unsintered particles. The make-up of a typical portion of the compact mass obtained is illustrated in FIG. 5.

Figure 6:
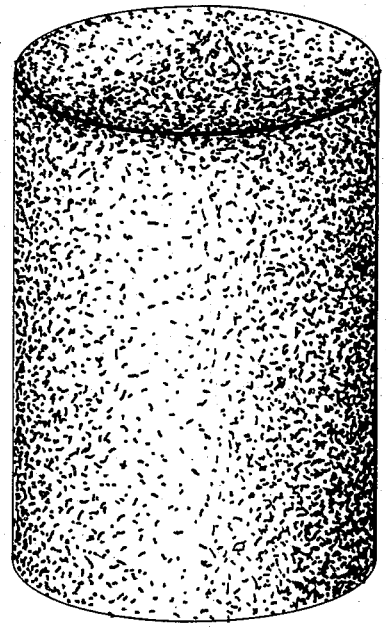
FIG. 6 is a perspective view of a unitary polycrystalline diamond composite prepared according to the method of the present invention.

The static method of the present invention is directed to the preparation of a unitary shaped polycrystalline diamond composite. Unlike the fragmentary bits and pieces mixture obtained by the shock wave method of the prior art, the present method is operative at much lower pressures to produce a relatively large and more desirable unitary composite. Further, this larger composite is a single coherent entity conforming to the shape of the container in which the diamond particles are sintered together. A typical cylindrical entity, prepared as described in the examples which follow, is shown in FIG. 6.

More specifically, the present invention is a method for making a unitary polycrystalline diamond composite which comprises sintering initially distinct diamond particles at a condition of pressure and temperature within area A of FIG. 1 and the composite product thereby produced.

The diamond particles sintered according to the method of the present invention may be either natural or synthetic in origin. Their size may range from about $1 \times 10^{-2}$ microns to over 1 mm. in diameter; fibers, slivers and plates with one or more axial dimensions in excess of 1 mm. may also be utilized. A relatively uniform size distribution is preferred but a mixture of various particle types, sizes and shapes may be utilized. Larger particles ranging from about 1 mm. to 1 cm. or more in size may be mixed with the finer diamond particles and the whole sintered into a unitary composite.

In order to produce a polycrystalline composite retaining the desirable characteristics of diamond, it is essential that the particles be sintered at a pressure-temperature condition falling within area A of FIG. 1. Area A is bounded on the left by an approximate minimum practical sintering temperature of about 1100°K and on the right by a temperature dependent minimum stabilization pressure line. The minimum pressure required varies somewhat with the size, purity and surface characteristics of the diamond particles undergoing sintering. The time required to produce a satisfactory composite is rather long at 1100°K (about one week) but decreases as the temperature is increased. For example, sintering times of the order of about a minute and a second, respectively, at 2300°K and 3000°K will yield dense strong diamond-like polycrystalline composites. However, as the sintering temperature is increased, it becomes even more essential to select operating pressures such that the pressure-temperature condition remains to the left of the approximate minimum stabilization pressure line shown in FIG. 1. Otherwise the diamond material will convert into graphite or other less desirable forms of carbon.

As shown in FIG. 1, the minimum stabilization pressures required in practicing the method of the present invention at temperatures above about 1200°K are very high. It is apparent that the use of special equipment capable of producing and withstanding the temperatures and pressures required is necessary. Apparatus such as that described in my earlier U.S. Pat. Nos. 2,918,699 (the tetrahedral press), 2,941,248 (the belt) or 3,159,876 (prismatic press) are particularly suited for this purpose.

The following non-limiting example illustrates the practice of my invention using the prismatic press described in U.S. Pat. No. 3,159,876. As shown schematically in FIG. 2, the press includes a pair of identical anvils 10 having equal square faces 11 with edges 0.375 inch in length mounted for rectilinear movement along a common axis. Two additional pairs of identical square faced anvils 10' and 10'' also mounted for rectilinear movement are positioned in the common plane normal to the common axis of the first pair of anvils 10. The three pairs of anvils converge to a common intersection and the six faces of the anvils would define the faces of a cube at their position of contact if cell 12 were absent.

The main body of the cell 12 is 0.470 inch on edge and is fabricated of pyrophyllite. As illustrated in FIG. 3, within the body of the cell are steel current rings 15 and 15' 0.313 inch O.D. by 0.219 inch I.D. by 0.094 inch long contacting molybdenum current discs 14 and 14' 0.313 inch in diameter by 0.005 inch thick. Contacting the molybdenum discs is a cylindrical graphite tube 16 0.155 inch O.D. by 0.100 inch I.D. by 0.187 inch long via graphite end discs 17 and 17'. The diamond particles 13 are contained within the cylindrical graphite tube and the resulting diamond composite is cylindrical in configuration as shown in FIG. 6.

In beginning a run, the diamond particles are tamped into the graphite tube (a green compact may also be utilized). The cell is assembled, its exterior painted with a water suspension of red iron oxide and dried for 30 minutes at 110°C. The cell is then positioned in the press and the three pairs of anvils advanced until their faces impinge squarely on the six cubic faces of the cell. The anvil faces are smaller than the cell faces and a further increase in pressure squeezes out pyrophyllite from the edges of the cell to form a gasket with the sloping shoulders of the anvils. The oil pressure to the press in this run was then rapidly increased to about 6,000 psi corresponding to a ram thrust of about 150 tons transmitted to the anvils. This in turn corresponds to a pressure of about 85 kilobars or 1,250,000 psi on the diamond particles within the graphite tube.

A 60 cycle, single phase, alternating current was passed from one anvil successively through the steel current ring 15, molybdenum current disc 14, graphite end disc 17, graphite tube 16, graphite end-disc 17', molybdenum current disc 14' and steel current ring 15' to the opposite anvil face. The relatively high electrical resistance of the graphite and the molybdenum current discs caused these components to heat up quickly and within seconds transfer their heat to the diamond particles 13 undergoing sintering. Using the voltage to control heating, the 1–5 micron average size diamond particles utilized in this run were held at about 2440°K for about 3 minutes. The heating current was then switched off and the sample cooled to near room temperature in about 10 seconds. Pressure was discontinued and the sample cell removed from the press, opened, and the resultant polycrystalline diamond composite removed as a cylinder about 0.086 inch in diameter by 0.148 inch long weighing about ¼ carat. The unitary composite was high in strength, white in color, electrically insulating and had a density of 3.48 g/cm$^3$ and a mohs hardness of 10. Comparison tests showed that the polycrystalline composite of the present invention had about the same ability to scratch, cut, abrade and resist wear as natural diamonds of about the same size. The products of the present invention have particular utility as drilling stones, cutting tools and bits, indentors, stylii, anvils, wear-resistant parts, bearings, dielectrics, heat sinks, dies, abrasives, gemstones, crucibles, refractories, solid state devices, optical devices and so forth.

It is apparent, starting with diamond particles at normal room temperature and pressure, it is necessary to pass through other pressure-temperature conditions in order to bring the particles to the desired pressure-temperature area A of FIG. 1. In general, any route through area B to area A is acceptable and the time taken to pass through area B is not critical. On the other hand, passage through area C, a region in which diamond particles decompose into non-diamond carbon should be avoided or the region traversed at an extremely rapid rate. Similar considerations apply after the diamond particles have been held in area A for the desired sintering time and the sintered diamond composite is being returned to room temperature and pressure. Any path through area B would be satisfactory and passage through region C is to be avoided. In practice, this is most conveniently accomplished by cooling prior to pressure reduction.

The above-offered example is intended only to illustrate the present invention. Other variations falling within the scope of the invention will suggest themselves to those skilled in the art and my invention is as claimed.

I claim:

1. A method of forming a unitary polycrystalline diamond composite, comprising:
   a. placing into a press for applying high temperature and pressure a mass of discrete particles of diamond selected from the group consisting of natural diamond and synthetic diamond at ambient temperature,
   b. applying by said press an increasing pressure to said mass and heating said mass to a temperature between 1100° – 3500° K while under a pressure maintained above and to the left of the minimum stabilization pressure line of FIG. 1, whereby substantially all of said diamond particles are sintered and consolidated into a unitary composite,
   c. cooling said diamond composite to less than 1100° K, during which said pressure is maintained above and to the left of said miminum stabilization pressure line, and
   d. pressure relieving said diamond composite to ambient conditions.

2. A method according to claim 1 wherein the step b comprises heating said mass to a temperature of about 2440°K and maintaining the pressure at about 85 kilobars.

* * * * *